United States Patent [19]

Hayashi

[11] Patent Number: 5,044,917

[45] Date of Patent: Sep. 3, 1991

[54] APPARATUS FOR STRETCHING DOUGH

[75] Inventor: Torahiko Hayashi, Utsunomiya, Japan

[73] Assignee: Rheon Automatic Machinery Co., Ltd., Utsunomiya, Japan

[21] Appl. No.: 548,038

[22] Filed: Jul. 5, 1990

Related U.S. Application Data

[62] Division of Ser. No. 487,700, Mar. 1, 1990.

[30] Foreign Application Priority Data

Mar. 6, 1989 [JP] Japan ................................. 1-53319

[51] Int. Cl.[5] .............................................. A21C 3/02
[52] U.S. Cl. .................................... 425/373; 426/512; 426/517
[58] Field of Search ................. 425/373; 426/512, 517

[56] References Cited

U.S. PATENT DOCUMENTS 4,692,110 9/1987 Hayashi ............................. 425/373

Primary Examiner—Willard E. Hoag
Attorney, Agent, or Firm—Guy W. Shoup; Paul J. Winters

[57] ABSTRACT

An apparatus for stretching dough is provided, by which bread dough or confectionery dough is continuously and smoothly stretched by linearly reciprocating a roller over the surface of dough which is continuously coveyed by a series of conveyors, while the roller is rotated by a drive means, and by which method and apparatus the dough can be smoothly stretched without the accumulation of the dough in front of the entrance of the apparatus, thereby obtaining the desired thickness of dough in one operation from the continuously supplied dough material.

3 Claims, 4 Drawing Sheets

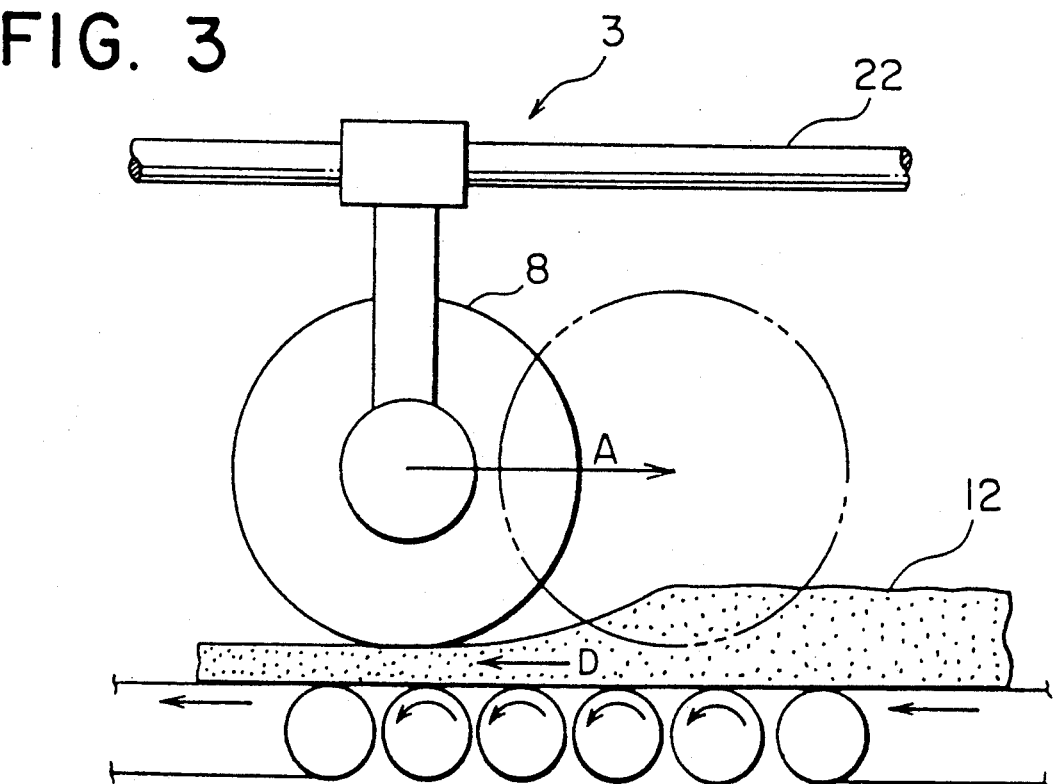
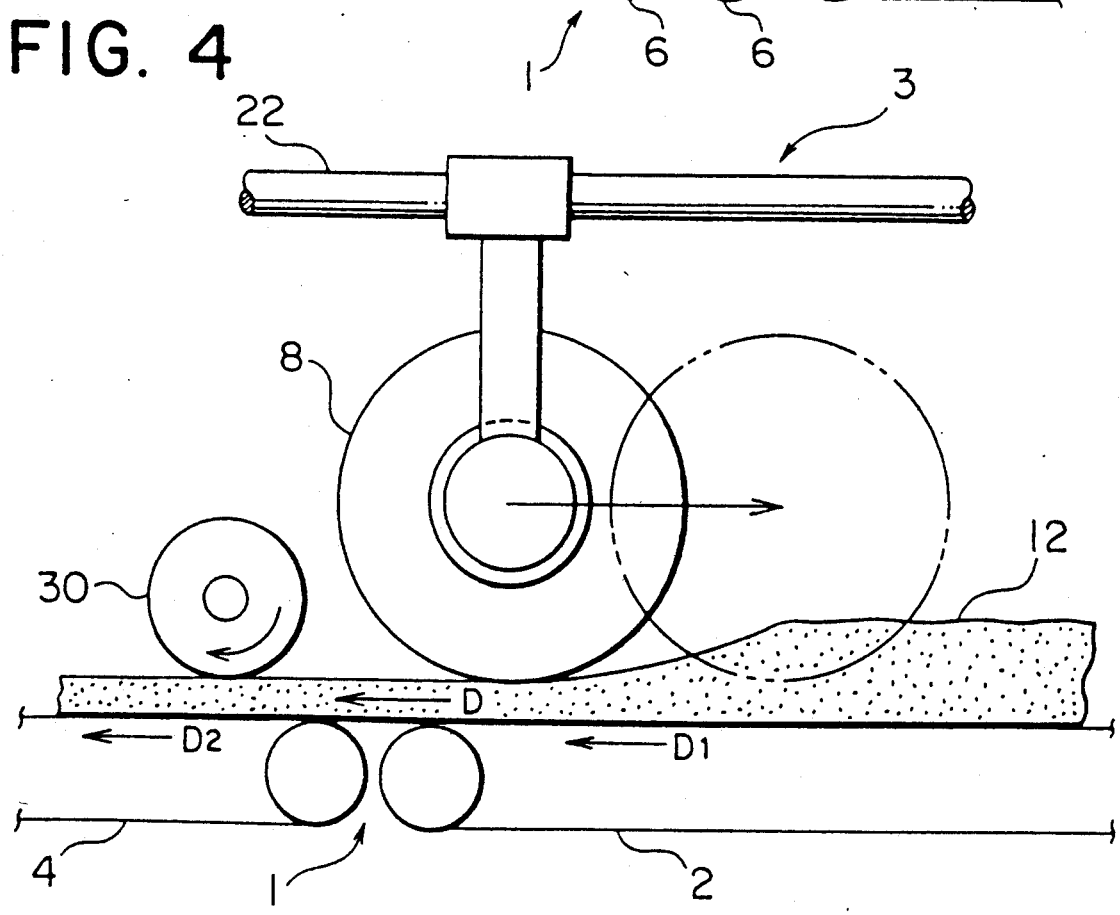

APPARATUS FOR STRETCHING DOUGH

This application is a division of application Ser. No. 07/487,700, filed Mar. 1, 1990.

BACKGROUND OF THE INVENTION

1. Field of Invention

This invention relates to apparatus for stretching dough, and, more particularly, to apparatus for stretching plastic materials for bread dough or confectionery dough.

2. Description of Prior Art

Plastic materials for bread dough or confectionery dough have been continuously stretched by various stretchers. Previously an apparatus for stretching dough in which two conveyors are serially disposed and a roller is disposed at a fixed position above a downstream conveyor has been preferably used due to its relatively simple mechanism. In this prior apparatus the downstream conveyor is driven faster than the upstream one so that the dough is stretched. The roller is rotated at the same peripheral speed as that of the conveying speed of the downstream conveyor, and in the same direction as that of the dough being conveyed. The main function of this prior apparatus depends on the compression by the roller of the dough, while the roller is in contact with the surface of the dough, and rolls on it. Therefore, the stretching ratio of the dough in terms of the thickness of the dough before stretching is small compared to the thickness of the dough after stretching, and the tissue of the dough tends to be destroyed. Further, when the thickness of the dough to be stretched is relatively larger compared to the gap between the roller and the surface of the downstream conveyor, frequently the dough cannot smoothly advance between the roller and the surface of the conveyor, and a substantial part of it stays in front of the roller, which results in lowering the manufacturing efficiency.

SUMMARY OF THE INVENTION

It is therefore an object of this invention to provide a method of stretching dough in which a roller is reciprocated over the surface of the dough being continuously conveyed by at least two serially disposed conveyors, while the roller is rotated by a drive means. Since the roller is reciprocated over the surface of the dough, and the peripheral speed of the roller when it moves upstream is higher than the total of the speed of the movement of the dough plus the speed of the linear movement of the roller, a tangential friction force caused between the surface of the dough and the periphery of a roller is generated along the surface of the dough, in the downstream direction. Therefore, the dough does not accumulate upstream of the roller, and thus smoothly enters the gap between the roller and the conveyor, thereby the dough is smoothly stretched.

Another object of this invention is to provide a method of stretching dough. The concept of this method is the same as that of the above-mentioned method, except that the speed of the linear movement of the roller is higher than the speed of the movement of the dough, and the peripheral speed of the roller is equal to or lower than the difference between the speed of the linear movement of the roller and the speed of the movement of the dough when the roller moves downstream. In this method, the dough is more effectively stretched because the number of reciprocations of the roller within a certain period of time increases, and the periphery of the roller applies a tangential friction force in the downstream direction along the surface of the dough when the roller moves downstream.

Still another object of this invention is to provide an apparatus for working the above-mentioned methods, that comprises a means for rotating a roller (8) when said roller moves upstream at a peripheral speed higher than the total of the speed of the movement of the dough plus the speed of the linear movement of the roller, and when said roller moves downstream at a peripheral speed equal to or lower than the difference between the speed of the linear movement of the roller and the speed of the movement of the dough, and a means for switching the rotational direction of said roller at the upstream and downstream ends of the reciprocating strokes of said roller.

In one aspect of this invention an apparatus for stretching dough is provided that comprises a roller rotatable around its own axis, and a conveyor system arranged below said roller and including at least two serially arranged conveyors, which can be belt conveyors, and roller conveyors or a mixture thereof, the conveying speed of an upstream conveyor of said conveyors being lower than that of the next downstream conveyor, characterized in that there are provided a drive means for reciprocating said roller over the surface of the dough, a means for rotating said roller at a peripheral speed higher than the total of the speed of the movement of the dough plus the speed of the linear movement of the roller when said roller moves upstream, and at a peripheral speed equal to or lower than the difference between the speed of the linear movement of the roller and the speed of movement of the dough when said roller moves downstream, and a means for switching the rotational direction of said roller at the upstream and downstream ends of the reciprocating strokes of said roller.

BRIEF DESCRIPTION OF THE DRAWINGS

FIG. 3 is a schematic and side elevation view, partly in section, illustrating the second embodiment of this invention.

FIG. 4 is a schematic and side elevation view, partly in section, illustrating the third embodiment of this invention.

PREFERRED EMBODIMENTS OF THE INVENTION

Figure 1:
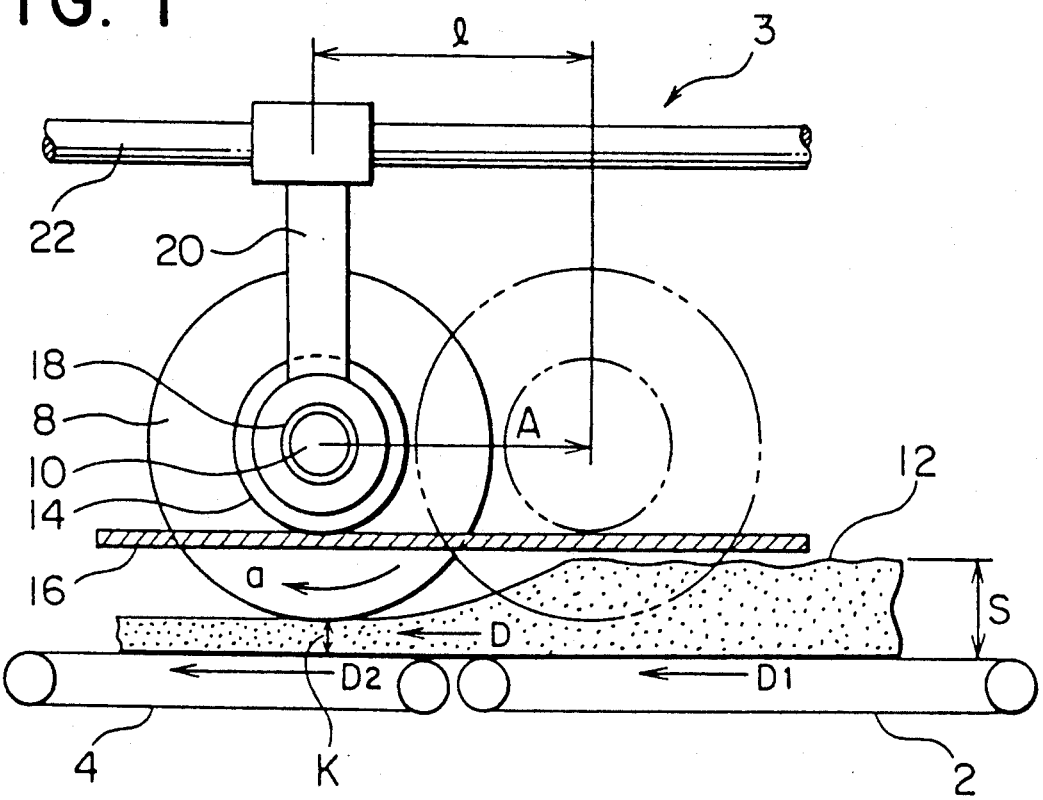
FIG. 1 is a schematic and side elevation view, partly in section, illustrating the first embodiment of this invention.

The first embodiment of this invention will now be described by reference to the drawings. In FIG. 1 an upstream conveyor (2) that is driven at speed (D1), and a downstream conveyor (4) that is driven at speed (D2), and a rail (22) horizontally positioned above the conveyors (2,4) and that is fixed to a frame (not shown), are arranged. A slidable cylindrical member attached to the upper end of a bracket (20) is mounted on the rail (22) to slide on it. The lowermost part of it is connected to the axle (10) of a roller (8). The bracket (20) is adapted to reciprocate over a distance (l) by a crank mechanism (not shown), so that the roller (8) can reciprocate over the distance (l) at a speed (R) in the linear direction. A first cam clutch (18) is mounted on the axle (10), and a first friction wheel (14) is mounted on the first cam clutch (18). The first friction wheel has a diameter smaller than the roller (8). The first cam clutch (18) can operatively couple the first friction wheel (14) to the axle (10) when the roller (8) moves upstream in the direction indicated by an arrow (A), and can disconnect said first friction wheel (14) from said axle (10) when said roller (8) moves downstream. The first friction wheel (14) is engageable with a first friction plate (16) that is fixedly and horizontally mounted to the frame (not shown) of an apparatus (3). When the roller (8) linearly moves upstream by the crank mechanism, the roller (8) is rotated in the direction indicated by an arrow (a). Dough (12) that has a thickness (S) is conveyed on the conveyors (2). The dough (12) on the conveyor (2) is moved at approximately the same speed as speed (D1), and the dough (12) on the conveyor (4) is moved at approximately the same speed as speed (D2). However, since speeds (D1) and (D2) differ from each other in stretching the dough, the speed of the movement of the dough varies at various positions on the conveyors (2,4). Therefore, it is assumed here that the movement of the dough (12) under an area that the roller (8) is reciprocated has an average speed of (D). The peripheral speed (P) of the roller (8) depends on the diameter of the first friction wheel (14), provided that other conditions, for example, the speed (R) of the linear movement of the roller (8), the diameter of the roller (8), and so forth, are assumed as constant. When the peripheral speed (P) of the roller (8) that is rotated in the direction indicated by an arrow (a) is equal to the total of the speed (D) of the movement of the dough plus the speed (R) of the linear movement of the roller (8), the roller (8) rolls on the surface of the dough (12), and does so generally without any friction being generated between the periphery of the roller (8) and the surface of the dough (12). When the roller (8) rolls on the surface of the dough, the length of travel of a certain point on the periphery of the roller (8) due to its rolling is about the same as the distance (l). In this case, no frictional force in the direction of movement is applied by the periphery of the roller (8) to the surface of the dough (12). However, when the peripheral speed (P) of the roller (8) is higher than the total of the speed (D) of the movement of the dough plus the speed (R) of the linear movement of the roller (8), the rotational loci of the circumference of the roller (8) are longer than the case where the roller (8) rolls on the surface of the dough without frictional force being generated between the periphery of the roller (8) and the surface of the dough. Therefore, the periphery of the roller (8) applies a tangential frictional force in the downstream direction along the surface of the dough (12), while the roller (8) is moved upstream, and the portion of dough at its surface is compelled to be pushed downstream. The speed (R) of the linear movement of the roller may preferably be higher than the speed (D) of the movement of the dough, so that a large number of reciprocating movements of the roller can more smoothly stretch the dough.

Figure 7:
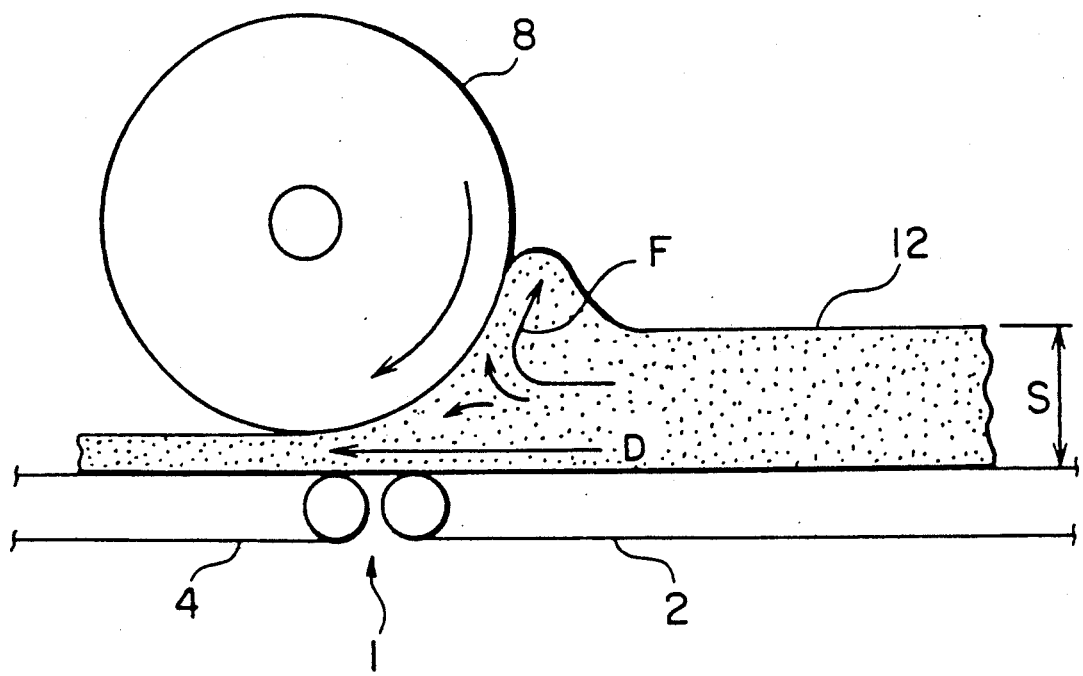
FIG. 7 is a schematic and side elevation view, partly in section, illustrating the apparatus of the prior art.

In contrast, in the apparatus of the prior art shown in FIG. 7, dough (12) that has a thickness (S) that is larger than the gap between the roller and the surface of the conveyor may not always pass the roller (8) without leaving behind a substantial amount of dough, which flows along an arrow (F), thereby accumulating in front of the roller (8).

Figure 2:
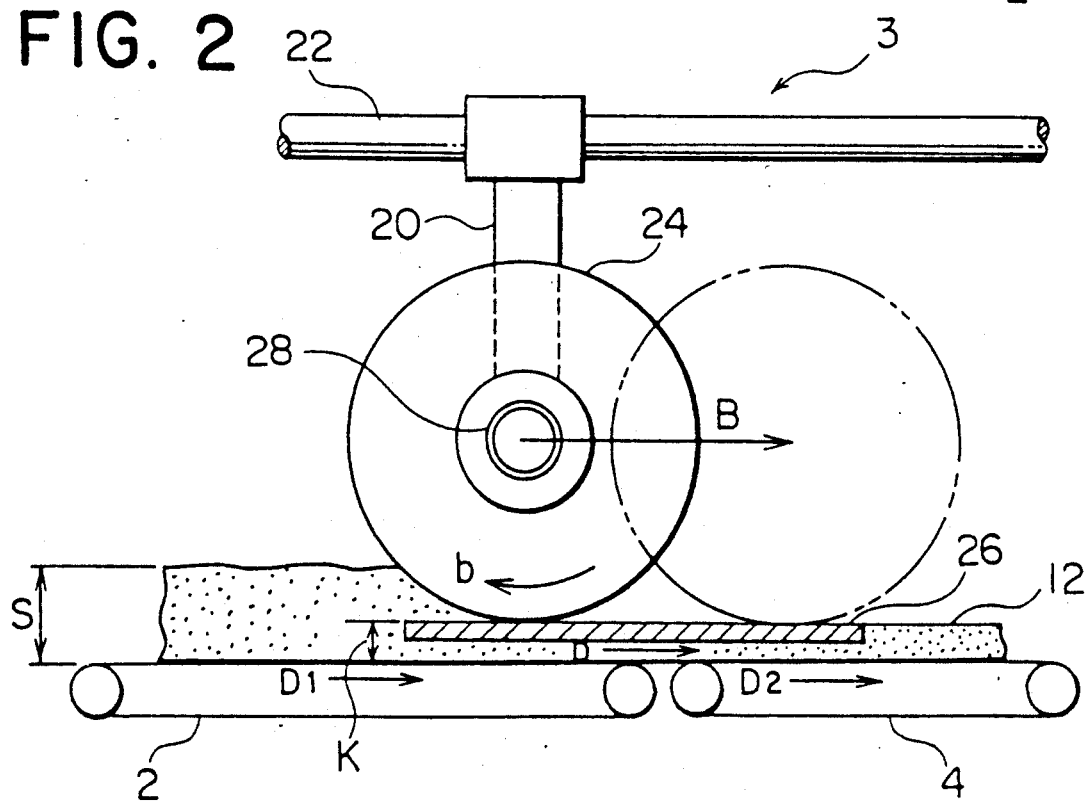
FIG. 2 is a schematic and side elevation view, partly in section, viewed from behind the apparatus of FIG. 1.

FIG. 2 shows the apparatus of the first embodiment viewed from behind the apparatus of FIG. 1. In FIG. 2, the axle (10) of said roller (8) is further provided with a second friction wheel (24) that has a diameter somewhat larger than that of the roller (8), and said second friction wheel (24) is mounted to said axle (10) through a second cam clutch (28). The second cam clutch (28) can operatively couple the second friction wheel (24) to the axle (10) when said roller (8) moves downstream, and can disconnect the second friction wheel (24) from the axle (10) when the roller (8) moves upstream. The friction wheel (24) is engageable with a second friction plate (26) fixedly and horizontally mounted to the frame (not shown) of the apparatus (3). When the roller (8) linearly moves downstream in the direction indicated by an arrow (B), the roller (8) is rotated in a direction indicated by an arrow (b). When the peripheral speed (P) of the roller (8) that is rotated in a direction indicated by an arrow (b) is equal to the difference between the speed (R) of the linear movement of the roller (8) and the speed of the movement of the dough when the roller (8) moves downstream, the roller (8) rolls on the surface of the dough (12), and does so generally without any friction being generated between the periphery of the roller (8) and the surface of the dough (12). Since the second friction wheel (24) has a diameter somewhat larger than that of the roller (8), the peripheral speed (P) of the roller (8) is lower than the difference between the speed (R) of the linear movement of the roller (8) and the speed of movement of dough when the roller (8) moves downstream, the periphery of the roller (8) applies a tangential frictional force in the downstream direction along the surface of the dough (12), while the roller (8) is moved downstream, to compel the portion of dough at its surface to be pushed downstream. If the speed (R) of the linear movement of the roller (8) is equal to the speed (D) of the dough when the roller (8) moves downstream, the roller (8) stays at a same position on the surface of the dough (12), while the roller (12) linearly moves together with the dough. The crank mechanism can be replaced with other suitable drive means (not shown). In this case, the periphery of the roller (8) applies a tangential frictional force in the upstream direction along the surface of the dough (12). Therefore, the speed (R) of the linear movement of the roller (8) is preferably higher than the speed (D) of the movement of the dough (12), when the roller (8) moves downstream. When the roller (8) moves upstream, the speed (R) of the linear movement of the roller (8) may also be higher than the speed (D) of the movement of the dough (12).

Thus, the dough (12) is smoothly stretched by reciprocating the roller over its surface, while the roller (8) is rotated, without the accumulation of the dough (12) in front of the roller (8). In this embodiment dough that has a thickness of about 20 $_{mm}$ is stretched to a (K) of about 2.5 $_{mm}$ under the following conditions:

Speed (D) of the movement of the dough: about 1$_m$/min

Diameter of the roller (8): 100 $_{mm}$

Diameter of the first friction wheel (14): 50 $_{mm}$ (l): 100 $_{mm}$

Stroke of the reciprocating movement of the roller (8): 100 $_{mm}$

The number of the reciprocating movements of the roller (8): 200/min

The speed (R) of the linear movement of roller (8): 100 $_{mm}$ × 200 = 20 $_m$/min The peripheral speed of the first friction wheel (14): 20 $_m$/min The circumference of the roller (8): 100 $_{mm}$ × 3.14 = 31.4 $_{cm}$ The circumference of the first friction wheel (14): 50 $_{mm}$ × 3.14 = 15.7 $_{cm}$ The peripheral speed (P) of the roller (8) when roller (8) moves upstream: (20 ÷ 15.7) × 31.4 = about 40 $_m$/min The peripheral speed (P) of the roller (8) when the roller (8) moves downstream: 20 $_m$/min (the roller rolls on the surface of the dough without generating any friction between the periphery of the roller and the dough)

In contrast, in the apparatus of the prior art as shown in FIG. 7, conditions for the operation are as follows:

The speed of the movement of the dough: about 1 $_m$/min

The diameter of the roller (8): 100 $_{mm}$

The peripheral speed of the roller (8): about 1 $_m$/min

The distance between the roller and the surface of the conveyor: 7 $_{mm}$

When the original thickness of the dough is about 20 $_{mm}$, the dough entering under the roller can be stretched to the thickness of about 8 $_{mm}$, and a substantial amount of dough may stay upstream of the roller unless a complicated mechanism is designed to avoid the bulging of dough upstream of the roller. Further, the apparatus of the prior art cannot stretch the dough to a thickness comparable to that of the stretched dough of this invention.

FIG. 3 shows the second embodiment of this invention, where a roller conveyor (1) that comprises a plurality of rollers (6) is disposed between two belt conveyors (their main parts are not shown). The conveying speeds of these conveyors differ, the conveying speed of the next downstream conveyor being in turn higher than that of the preceding conveyor. A series of conveyors for use in this embodiment may be composed of a plurality of belt conveyors, of a plurality of roller conveyors, or of a plurality of conveyors that include one or more belt conveyors and one or more roller conveyors. By this apparatus of FIG. 3 the dough (12) is as smoothly stretched as the dough (12) is stretched in the first embodiment. FIG. 4 shows the third embodiment of this invention, where an assisting roller (30) is further disposed above the conveyor (4) of the apparatus (3) of the first embodiment. The thickness of the dough stretched by the roller (8) and the conveyors (2, 4) tends to somewhat increase when the dough has a relatively high elasticity. Therefore, to avoid such an increase in the thickness of the dough the dough is further regulated by the assisting roller (30), which is preferably disposed at the downstream end of the series of conveyors. The assisting roller (30) is rotated in the same direction as the conveying direction of the dough (12), and the peripheral speed of the assisting roller (30) is the same as the speed of the conveyor at the downstream end (4).

Figure 5:
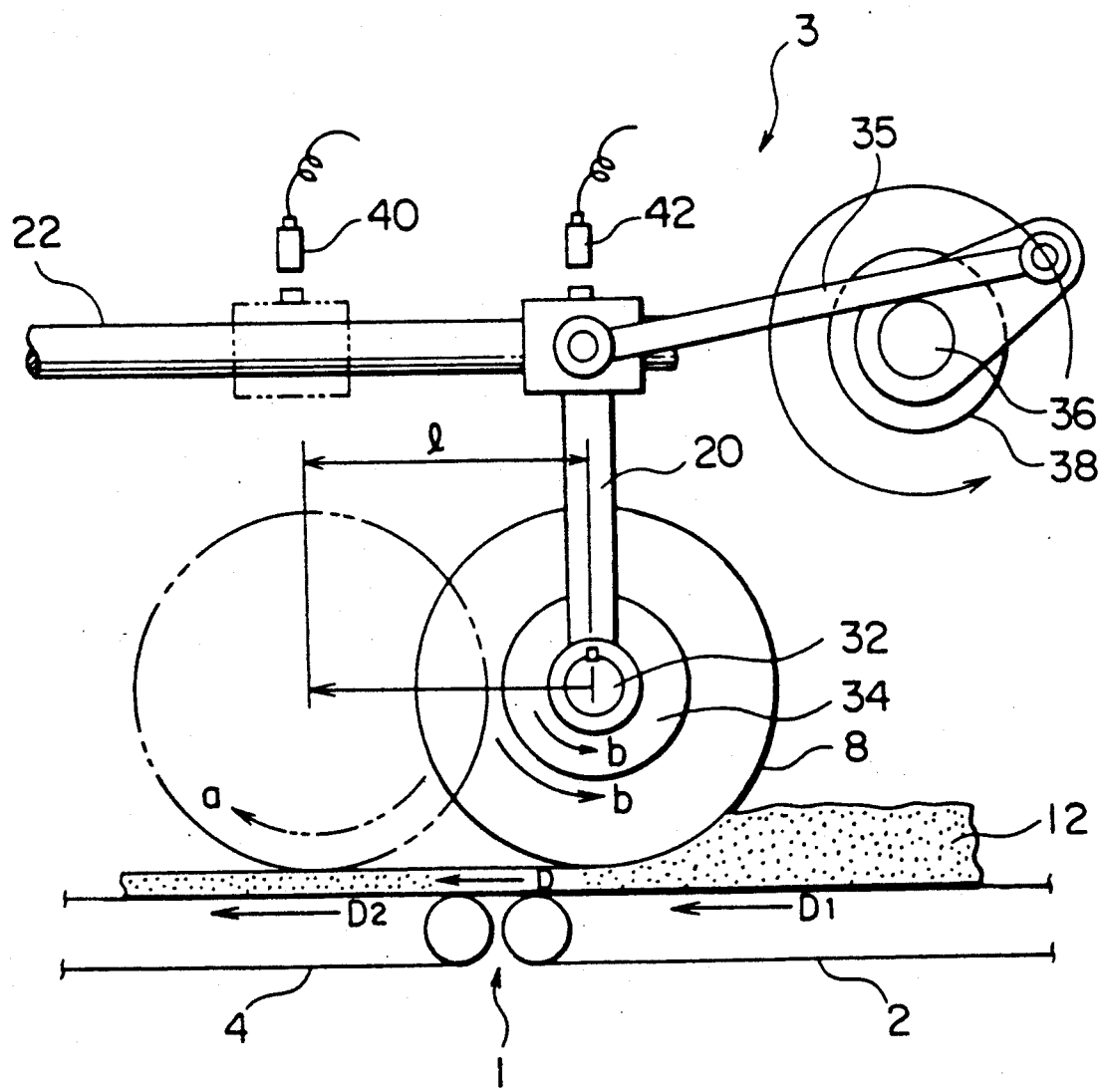
FIG. 5 is a schematic and side elevation view, partly in section, illustrating the fourth embodiment of this invention.

FIG. 5 shows the fourth embodiment of this invention, where a device for rotating the roller (8) is a built-in reversible motor (34), and a device for reciprocating the roller (8) comprises a servomotor (38), a crank shaft (36), and a crank (35). One end of the crank (35) is linked through a crank pin to a crank arm that is connected to the crank shaft (36). The other end of the crank (35) is linked through a pin to the uppermost part of the bracket (20). The roller (8) can be reciprocated by actuating the servomotor (38), at any desired speeds of the linear movement of the roller. The peripheral speed (P) of the roller (8) can be controlled by changing the frequency of the power source for the built-in reversible motor (34). The motor shaft (32) of the built-in reversible motor (34) is connected to the lowermost part of the bracket (20). The roller (8) is reciprocated over a distance (l) by the crank (35), while it is rotated by the built-in reversible motor (34). A sensor (42) is disposed above the rail (22) and at the upstream end of the reciprocating strokes of the roller (8). The sensor (42) can detect the arrival of the bracket (20) at the upstream end of the reciprocating strokes of the roller (8), and send to the built-in reversible motor (34) a signal to change the rotational direction of the built-in reversible motor (34), namely the roller (8), to a direction indicated by an arrow (b). A sensor (40) is disposed above the rail (22) and at the downstream end of the reciprocating strokes of the roller (8). The sensor (40) can detect the arrival of the bracket (20) at the downstream end of the reciprocating strokes of the roller (8), and send to the built-in reversible motor (34) a signal to change the rotational direction of the built-in reversible motor (34), namely the roller (8), to a direction indicated by an arrow (a). In the apparatus of this embodiment, the peripheral speed (P) of the roller (8) can be changed during its reciprocating movement to meet the conveying speed of the dough, independently of the speed of the linear movement of the roller. By the apparatus of this embodiment, the dough (12) is as smoothly stretched as the dough (12) is stretched in the first embodiment.

Figure 6:
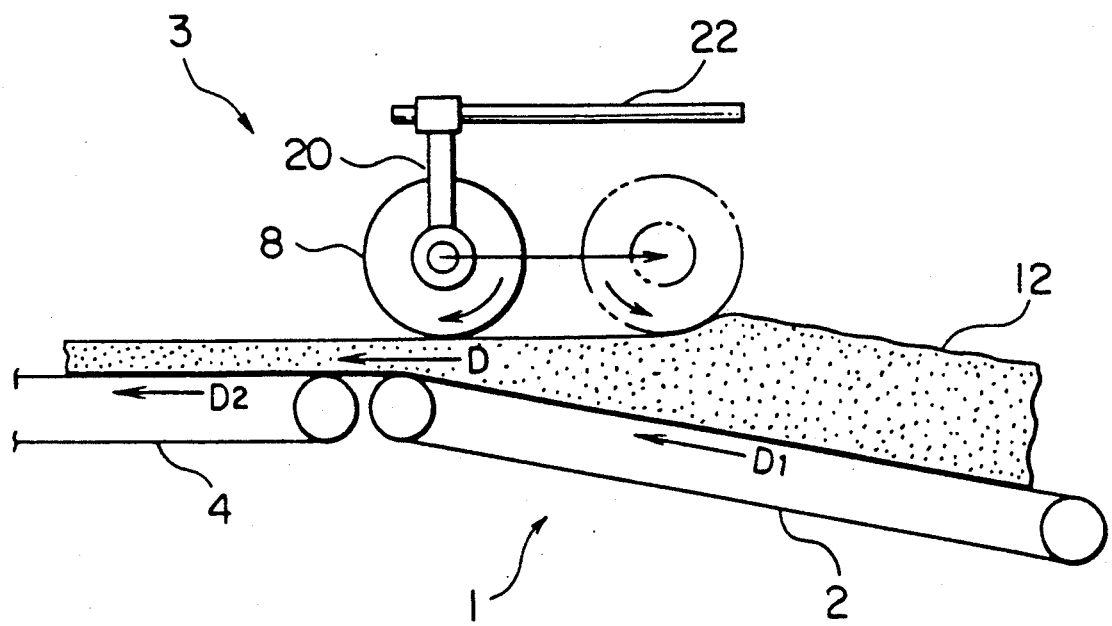
FIG. 6 is a schematic and side elevation view, partly in section, illustrating the fifth embodiment of this invention.

FIG. 6 shows the fifth embodiment of this invention, where the conveying surface of the conveyor (2) is inclined against that of the conveyor (4), under the linearly reciprocating area of the roller, to make an angle. In this embodiment, since the form of the portion of the dough under the linearly reciprocating area of the roller is tapered, the stretching is more smoothly attained. Also, in place of inclining the conveyor (2), the loci of the linear movement of the roller (8) may be inclined against the straight conveying surface formed by the series of the conveyors. For example, in FIG. 6 the rail (22) may be inclined so that the vertical position of the uppermost part of the bracket (20) at the upstream end of the reciprocating strokes may be raised.

As described above, the method and apparatus for stretching dough of this invention can smoothly stretch the dough without the accumulation of the dough in front of the entrance of the apparatus, thereby obtaining the desired dough thickness in one operation from the continuously supplied dough material. These advantages are due to the rotation of the roller, while it is being reciprocated over the surface of the dough being continuously conveyed which applies to the dough the tangential force of the roller that is caused by the friction between the periphery of the roller and the surface of dough, along the surface of the dough. Further, since the contact portion of the roller with the surface of dough quickly changes due to the rotational and linear movements of the roller, the amount of the flour sprinkled onto the surface of dough to avoid the adhesion of the dough to the surface of roller is remarkably decreased, compared to the apparatus of the prior art. In conclusion, the simplified method and apparatus of this invention can increase stretching dough efficiency without using any large-scale apparatus, and can achieve low production costs.

I claim:

1. In an apparatus for stretching dough comprising a roller rotatable around its own axis, and a conveyor system arranged below said roller and including at least two serially arranged conveyors, the conveying speed of each conveyor of said serially arranged conveyors being lower than that of the next downstream conveyor, the dough being conveyed on an upper surface of said serially arranged conveyors, the improvement comprising:

drive means for reciprocating said roller over the surface of the dough, means for rotating said roller at a first peripheral speed which is higher than the total of the speed of movement of the dough plus the speed of the linear movement of the roller when said roller moves upstream, and at a second peripheral speed which is equal to or lower than the difference between the speed of the linear movement of said roller and the speed of movement of the dough when said roller moves downstream, and means for switching the rotational direction of said roller at the upstream and downstream ends of the reciprocating strokes of said roller.

2. The apparatus of claim 1, wherein:

the improvement further includes an axle of said roller having a first friction wheel mounted to said axle through a first connecting means that operatively couples said first friction wheel to said axle when said roller moves upstream, and disconnects said first friction wheel from said axle when said roller moves downstream, said first friction wheel being engageable with a first friction plate, which first friction plate is fixedly and horizontally mounted to the frame of the apparatus, and said axle of said roller is further having a second friction wheel mounted to said axle through a second connecting means that operatively couples said second friction wheel to said axle when said roller moves downstream, and disconnects said second friction wheel from said axle when said roller moves upstream, said friction wheel being engageable with a second friction plate, which second friction plate is fixedly and horizontally mounted to the frame of the apparatus.

3. The apparatus of claim 1 wherein:

the improvement further comprises: said means for rotating said roller being a built-in reversible motor in said roller to rotate said roller, and change the rotational direction of said roller.

* * * * *